United States Patent [19]
Mosca

[11] 3,939,306
[45] Feb. 17, 1976

[54] VIDEOTELEPHONE SYSTEM WITH CENTRALIZED SYNCHRONIZATION CONTROL

[75] Inventor: Virgilio Mosca, Milan, Italy

[73] Assignee: Societa Italiana Telecomunicazioni Siemens S.p.A., Milan, Italy

[22] Filed: June 11, 1974

[21] Appl. No.: 478,282

[30] Foreign Application Priority Data
June 12, 1973 Italy.................................. 25174/73

[52] U.S. Cl..... 179/2 TV; 179/15 BS; 178/69.5 DC
[51] Int. Cl.².......................................... H04N 5/04
[58] Field of Search............ 179/2 TV, 15 BS, 15 A; 178/69.5 TV, 69.5 DC

[56] References Cited
UNITED STATES PATENTS
3,525,808   8/1970   Brown.......................... 178/69.5 DC
3,567,861   12/1968  Webb........................... 178/69.5 DC FOREIGN PATENTS OR APPLICATIONS
1,173,918   12/1966  United Kingdom.............. 179/2 TV Primary Examiner—Douglas W. Olms
Attorney, Agent, or Firm—Karl F. Ross; Herbert Dubno

[57] ABSTRACT

A central office of a videotelephone system has a cross-bar switch to establish connections between incoming and outgoing video lines terminating at the transmitters and receivers of the videotelephone sets of the several outlying stations. A central sync-pulse generator works into the incoming video lines to control the sweep circuits of the video receivers of stations to which connections have been established, each video receiver being linked with the associated video transmitter through a delay circuit which actuates the line-scan generators of the transmitter and of the receiver with a relative offset compensating for the transit time of the sync pulses between the central office and the station. The sync pulses are supplied to each incoming video line through an amplifier stage preceded by a shunt circuit including a transistor to which quenching pulses for grounding the line are periodically applied by the sync-pulse generator.

8 Claims, 6 Drawing Figures

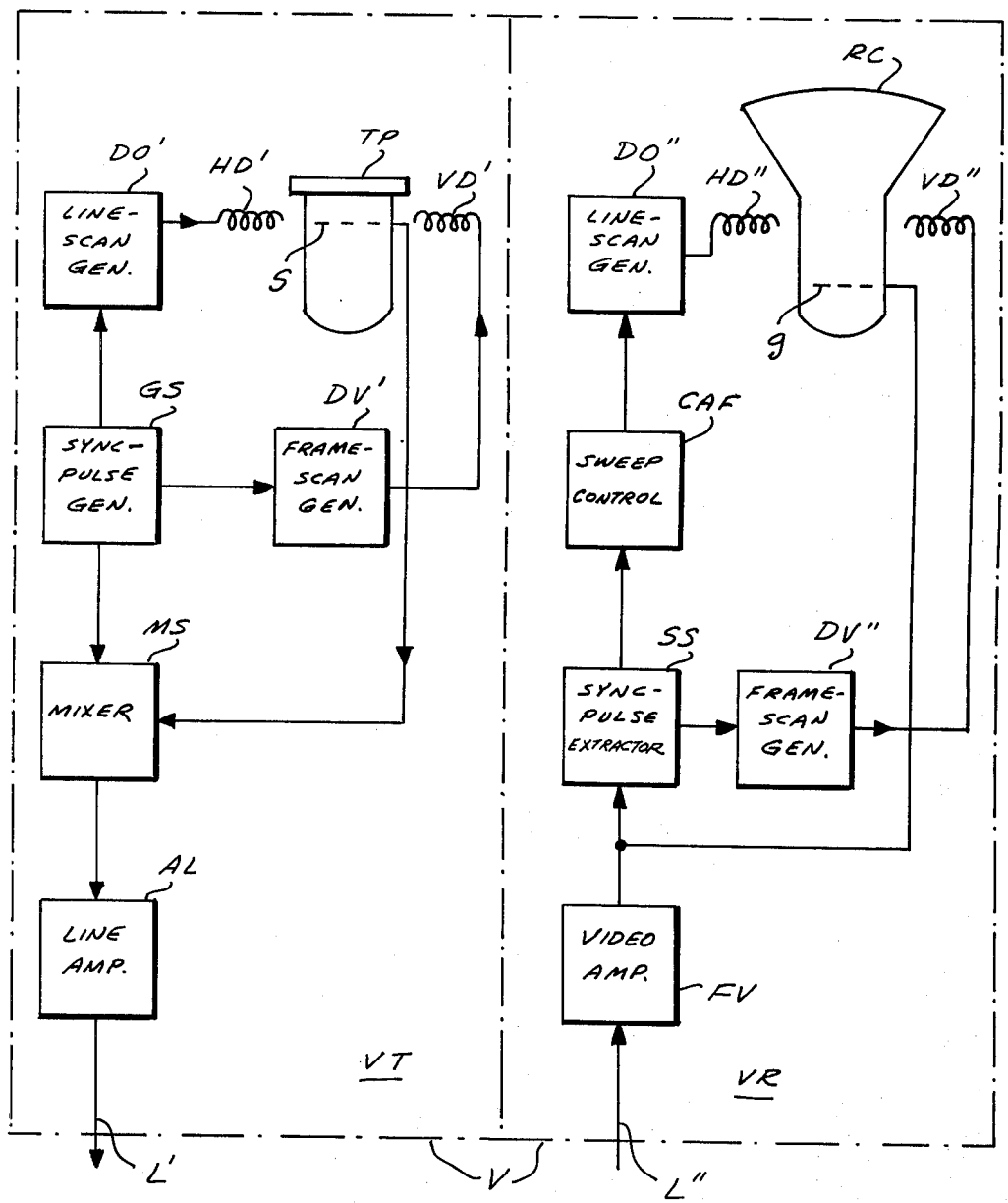

VIDEOTELEPHONE SYSTEM WITH CENTRALIZED SYNCHRONIZATION CONTROL

FIELD OF THE INVENTION

My present invention relates to a videotelephone system comprising a number of stations within a limited area, such as outlying stations associated with a private telephone exchange.

BACKGROUND OF THE INVENTION

It is known, in such a system, to equip each outlying station with a video transmitter and a video receiver in addition to the usual telephone apparatus, these instruments being linked by audio and video lines with the common central office. Each station also includes a source of synchronizing pulses which controls the sweep circuits of its own video transmitter as well as those of a remote receiver temporarily connected thereto by way of the central office. The synchronizing pulses are generated by individual crystal-stabilized oscillators operating independently of one another; such oscillators are relatively expensive and their duplication at each of the several stations weighs heavily in the overall cost of the system.

OBJECTS OF THE INVENTION

The general object of my present invention, therefore, is to provide a simplified videotelephone system in which this cost factor is substantially reduced.

A related object is to provide means in such a system for improving the operation thereof with suppression of crosstalk.

SUMMARY OF THE INVENTION

I realize these objects, in conformity with my present invention, by the provision of a single source of synchronizing pulses at the central office of such a videotelephone system, each of the associated outlying stations including a pulse extractor for separating the sync pulses from the accompanying video signals. The common pulse source is connected at the central office to a set of first links in parallel, namely the incoming transmission lines originating at the video transmitters of the outlying stations; a second set of links, i.e., the corresponding outgoing lines terminating at the associated video receivers, are connected at the several stations to the respective pulse extractors thereof. In this way, the sync pulses are transmitted through the switching equipment of the central office to the pulse extractor of any station included in an established videotelephone connection; the pulse extractor, in turn, feeds both the video transmitter and the video receiver of that station.

Where transit time is a factor, i.e., where the outlying stations are separated by substantial distances from the central office as may be the case in a network serving a large industrial complex, the sweep circuits of the video transmitter and the video receiver of a station cannot be operated in step with one another since the video signals sent over the intervening line links to the remote station will then be lagging behind the sync pulses arriving at that remote station directly from the central office. In accordance with an important feature of my invention, therefore, each station includes delay means for relatively staggering the operation of the transmitting and receiving sweep circuits to compensate for this time lag. Such compensation, in the case of a relatively compact communication network as here considered, will generally be required only for the line scan or horizontal sweep but not for the frame scan or vertical sweep.

BRIEF DESCRIPTION OF THE DRAWING

The above and other features of my invention will now be described in detail with reference to the accompanying drawing in which:

FIG. 2 is a block diagram of video equipment provided at a typical station of the conventional system of FIG. 1;

SPECIFIC DESCRIPTION

Figure 1:
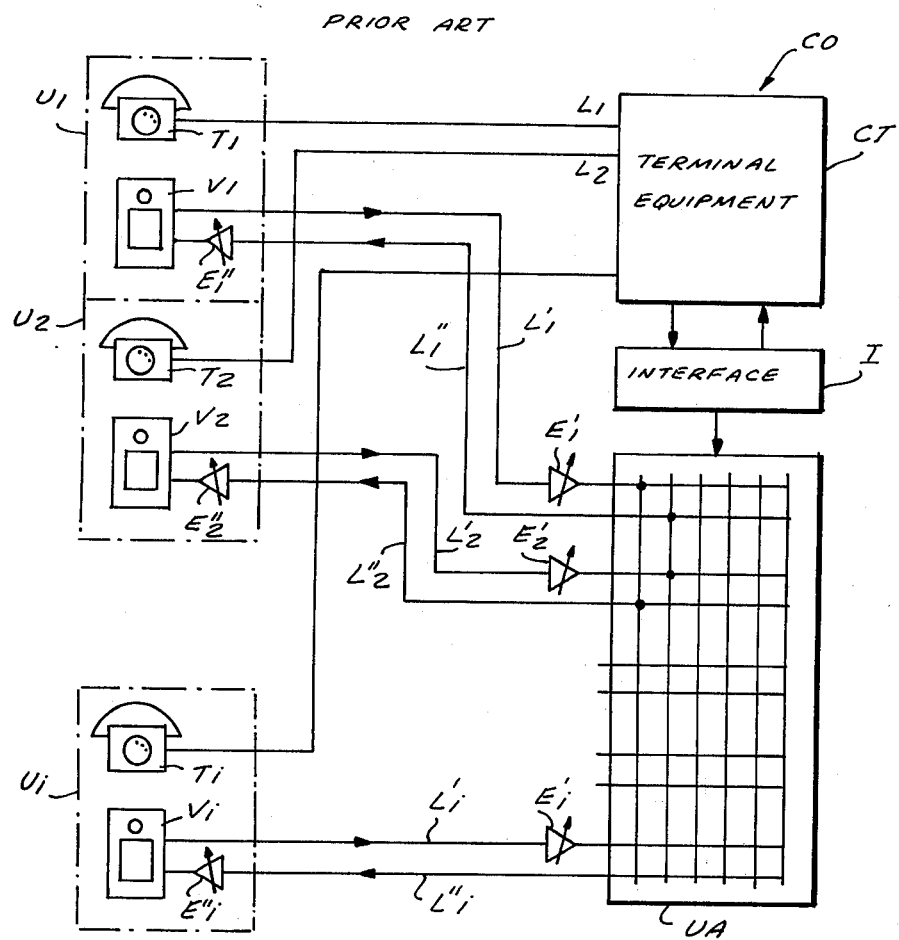
FIG. 1 is a schematic view of a conventional videotelephone system of the general type here considered.

In FIG. 1 I have shown a prior-art videotelephone system comprising a central office or exchange CO and a multiplicity of outlying stations partly illustrated at $U_1, U_2, \ldots U_i$. The central office CO includes the usual terminal equipment CT for establishing communication channels among the associated stations as well as between the latter and subscribers outside the system. Each station includes a telephone set $T_1, T_2, \ldots T_i$ linked with the terminal equipment CT via a respective audio line $L_1, L_2, \ldots L_i$; it further includes a video unit $V_1, V_2, \ldots V_i$ (generally designated V in FIG. 2) divided into a transmitting section VT and a receiving section VR. The transmitting sections are connected to the central office CO by way of respective first links $L'_1, L'_2, \ldots L'_i$ representing incoming video lines as seen from the central office; receiving sections are served by second links $L''_1, L''_2, \ldots L''_i$ constituting outgoing video lines. Each video line is provided at its far end with an amplification and equalization unit $E'_1, E'_2, \ldots E'_i$ at the central office in the case of the first links and $E''_1, E''_2, \ldots E''_i$ at the corresponding station in the case of the second links.

Terminal equipment CT includes selector switches for interconnecting the audio lines $L_1, L_2$, etc., of calling and called stations and for controlling, through an interface unit I, a cross-bar switch UA for simultaneously linking up the corresponding incoming and outgoing video lines $L'_1, L'_2$, etc., and $L''_1, L''_2$ etc.

In FIG. 2, where a generic video line L' originates at the transmitting section VT whereas a generic video line L'' terminates at the receiving section VR, the transmitting section is shown to comprise a camera tube TP with associated horizontal-deflection and vertical-deflection coils HD' and VD' whereas the receiving section VR includes a picture tube RC with horizontal-deflection and vertical-deflection coils HD'' and VD''. Also included in section VT is a sync-pulse generator GS individual to this station, generator GS controlling the energization of coils HD' and VD' through respective line-scan and frame-scan generators DO' and DV'. The output of sync-pulse generator GS is further delivered to a mixer MS also receiving video signals from a screen $s$ of tube TP, this mixer working through a line amplifier AL into transmission line L'.

Section VR has a sync-pulse extractor SS energized from line L″ through a video amplifier FV which may be part of the associated unit E″ (of FIG. 5), the video signals on that line going to the intensity-control grid $g$ of picture tube RC. Extractor SS controls the energization of coil VD″ through a frame-scan generator DV″, and that of coil HD″ through a line-scan generator DO″ by way of a crystal-stabilized automatic sweep-frequency-control circuit CAF.

In the operation of the conventional system of FIGS. 1 and 2, a temporary connection between two stations such as $U_1$ and $U_2$ is established by the equipment CT for voice signals and by the cross-bar switch UA for video signals, the latter passing from line $L'_1$ through unit $E'_1$ to line $L''_2$ as well as from line $L'_2$ through unit $E'_2$ to line $L''_1$. The video signals on lines $L'_1$ and $L''_2$ are accompanied by sync pulses generated at station $U_1$ whereas the video signals on lines $L'_2$ and $L''_1$ are accompanied by sync pulses generated at station $U_2$. Owing to the mutual proximity of these lines and the absence of synchronization between the two sync-pulse generators, a certain amount of interference between the transmitted and received signals is practically unavoidable.

For a description of my improved system, reference will now be made to FIGS. 3 and 4 in which elements corresponding to those of FIGS. 1 and 2 have been identically designated and need not be redescribed.

Figure 3:
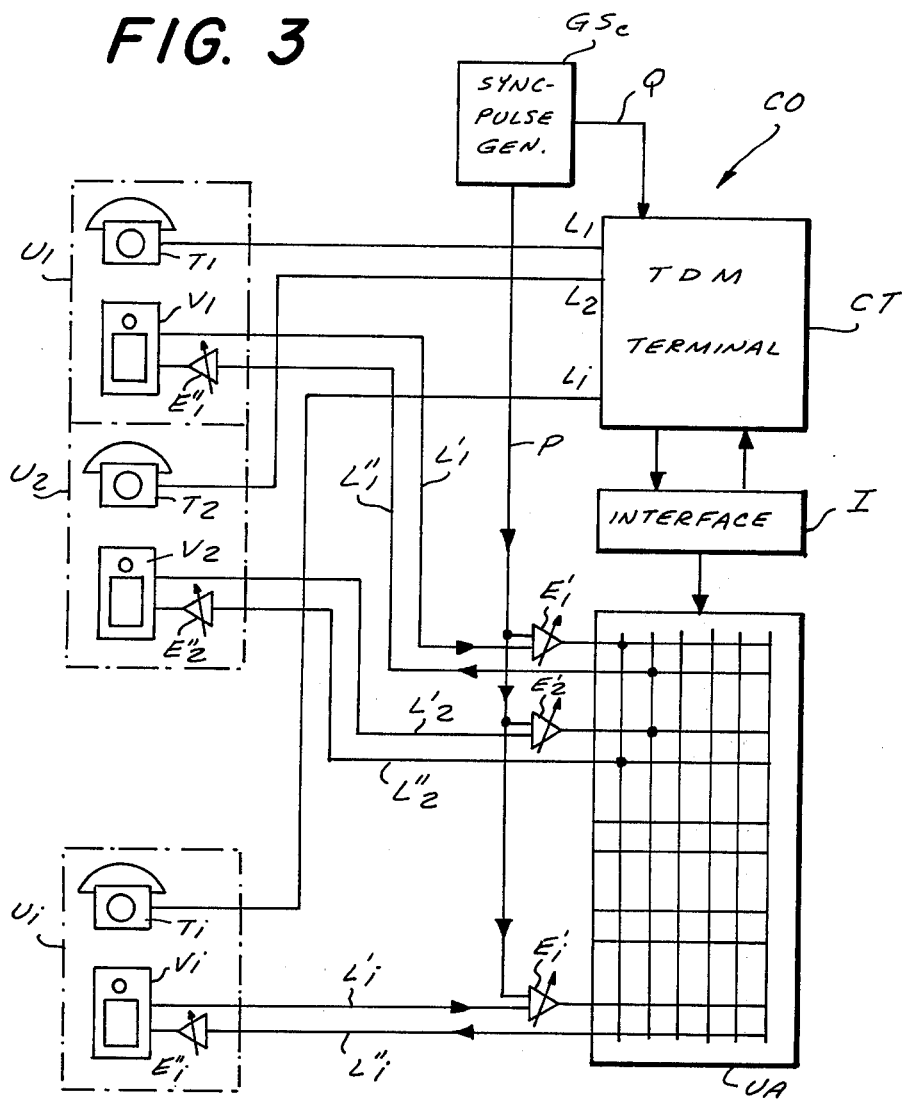
FIG. 3 is a view similar to FIG. 1, illustrating my present improvement.

A shown in FIG. 3, central office CO includes a common sync-pulse generator $GS_c$ working in parallel into the amplification and equalization units $E'_1, E'_2, \ldots E'_i$ of lines $L'_1, L'_2, \ldots L'_i$. If the terminal equipment CT of the central office is of the time-division-multiplex (TDM) type, generator $GS_c$ may also deliver sampling pulses on a lead Q to that equipment at a frequency of 8 kHz which corresponds to the international line frequency for videotelephone systems. The sync pulses for the video equipment, delivered to units $E'_1$, etc., via a lead $P_1$, thus include line-synchronization pulses with a cadence of 8 kHz (corresponding to a scanning cycle of 125 $\mu$s) and frame-synchronization pulses with a cadence of 50 Hz (corresponding to a scanning cycle of 20 ms).

Figure 4:
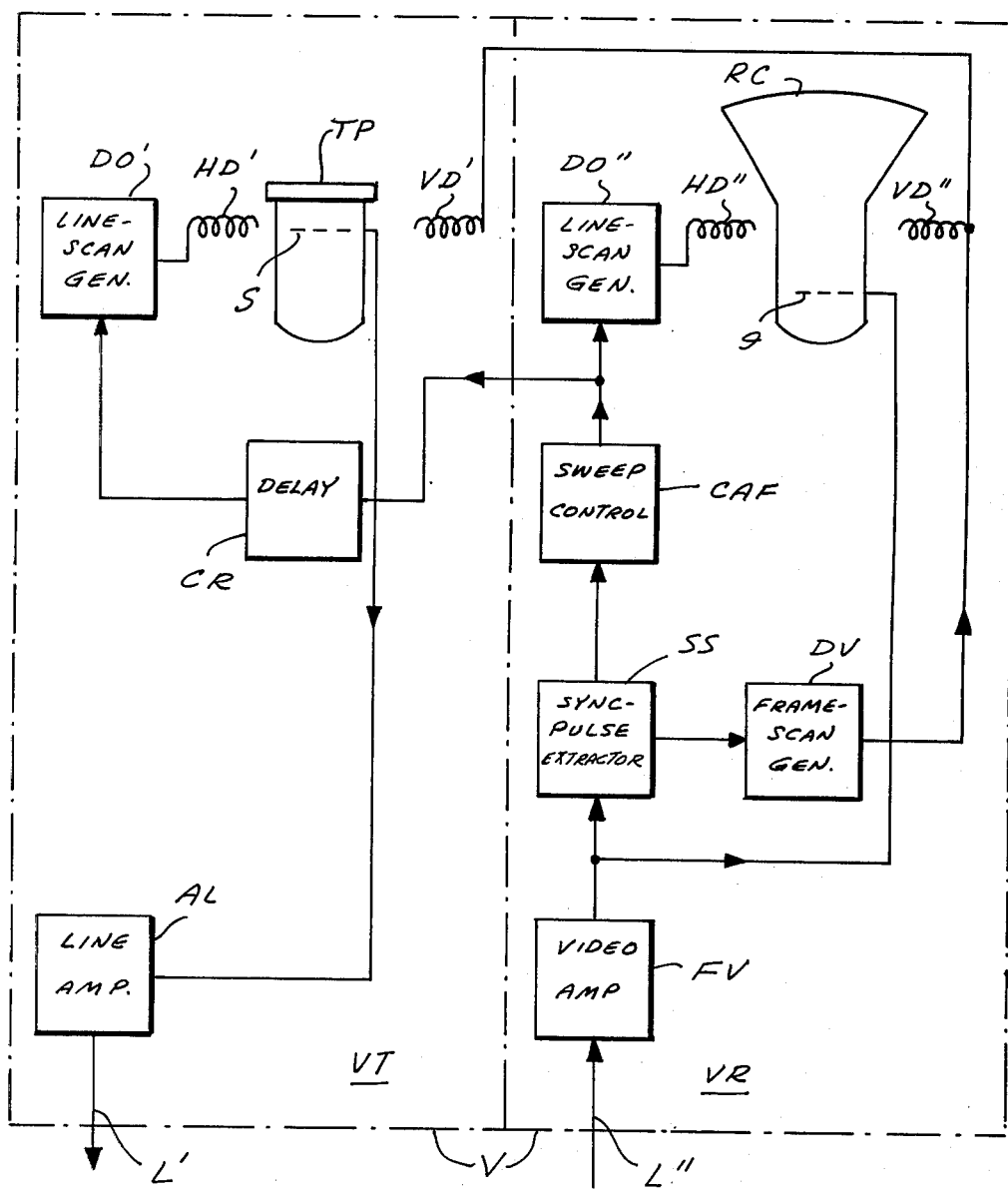
FIG. 4 is a view similar to FIG. 2, showing the video equipment at a typical station of the system of FIG. 3.

As will be seen from FIG. 4, the receiving station VR of my improved system is practically identical with that of the conventional system (FIG. 2) but the associated transmitting section VT lacks the sync-pulse generator GS, the frame-scan generator DV′ and the mixer MS of FIG. 2, the video signals from screen $s$ being delivered directly to line amplifier AL. Vertical-deflection coil VD′ of section VT is connected in parallel with coil VD″ of section VR to the frame-scan generator DV of the latter section; on the other hand, line-scan generator DO′ of section VT is connected to the output of automatic sweep-control circuit CAF in section VR, in parallel with line-scan generator DO″, through a delay circuit CR. The purpose of this delay circuit is to compensate for the transit time which the video signals from screen $s$ undergo in traveling to the remote station over the interconnected video links, i.e., over the line L′ emanating at the station here considered and the line L″ originating at the remote station communicating therewith.

In the above-discussed case of a connection between stations $U_1$ and $U_2$, for example, the sync pulses generated at the central office CO at a time $t_o$ reach the station $U_1$ with a delay $d_1$ and the station $U_2$ with a delay $d_2$. They arrive, therefore, at the transmitter of unit $V_1$ at a time $t_o + d_1$ and at the receiver of unit $V_2$ at a time $t_o + d_2$. Furthermore, the video signals emanating from unit $V_1$ require a time $d_1 + d_2$ to travel to unit $V_2$, the first video signal of a new scanning line arriving therefore at the latter receiver at a time $t_o + 2d_1 + d_2$ which is two transit-time periods $d_1$ after the arrival of the corresponding sync pulse (if it is assumed that this pulse coincides with the commencement of the line sweep). It thus becomes necessary to compensate for this lag by either delaying the line scan of the receiving section VR of unit $V_2$ or advancing the line scan of transmitting section VT of unit $V_1$ by the same time interval.

In the arrangement shown in FIG. 4, the latter solution is adopted by inserting the delay circuit CR between control circuit CAF and line-scan generator DO′, the lag introduced by this delay circuit being equal to the duration of a line-scanning cycle less the combined transit time ($2d_1$ in the case of unit $V_1$) on the associated line links L′ and L″. If these line links are metallic circuits having a length of 1 km, for example, the delay $d_1$ will be about 5 $\mu$s which is negligible compared with a frame cycle of 20 ms but is rather significant for a line cycle of 125 $\mu$s. Thus, the delay time of circuit CR in that instance should be 125 $\mu$s − 10 $\mu$s = 115 $\mu$s, involving an entirely unobjectionable downward shift of the received picture by the width of one line.

Alternatively, the circuit CR could be inserted between sweep-control circuit CAF and line-scan generator DO″ of the receiving section VR to introduce a delay of $2d$, here assumed to equal 10 $\mu$s. For the reasons stated, it will generally be unnecessary to stagger the frame cycle of the two sections so that a single frame-scan generator DV can be used for both sections.

Figure 5:
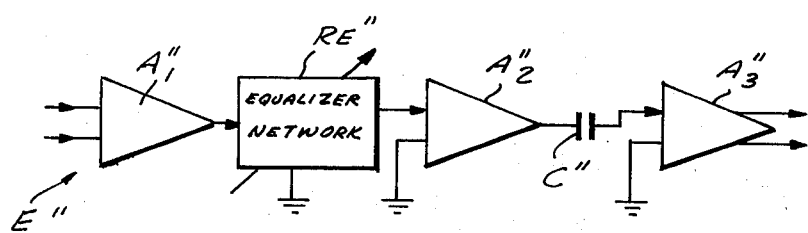
FIG. 5 is a block diagram of an amplification and equalization unit included in the system of FIG. 1 or FIG. 3.

Units $E''_1, E''_2, \ldots E''_i$ in FIG. 3 may each consist in well-known manner of several cascaded amplifier stages $A''_1, A''_2, A''_3$ in series with an equalizer network RE″, as shown at E″ in FIG. 5, the same as the units $E''_1$, etc., and $E''_1$, etc., in the conventional system of FIG. 1. Equalizer network RE″ is shown inserted between the first two amplifier stages $A''_1$ and $A''_2$, the latter being separated by a coupling capacitor C″ from the third amplifier stage $A''_3$. Stage $A''_1$ is an amplifier of the balanced-to-unbalanced type, whereas stage $A''_3$ is a complementary amplifier of the unbalanced-to-balanced type. Stage $A''_1$ suppresses line noises cophasally applied to its two inputs. Network RE″ provides attenuation and phase equalization over the transmitted band of video frequencies.

Figure 6:
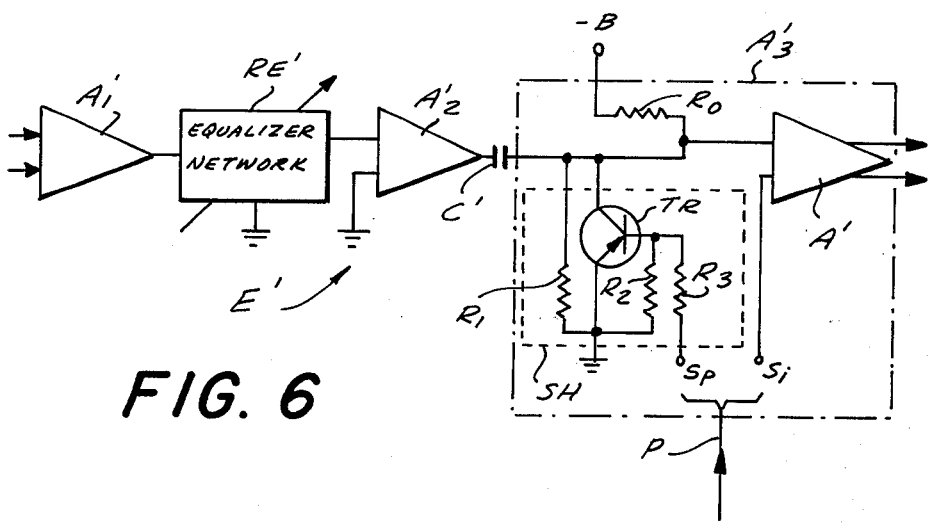
FIG. 6 is a circuit diagram of an amplification and equalization unit included in the system of FIG. 3.

FIG. 6 shows a unit E′ representative of units $E'_1$, etc., in the system of FIG. 3, this unit comprising amplifier stages $A'_1, A'_2$ and $A'_3$ as well as an equalizer network RE′ and a capacitor C′ having the same functions as their counterparts in FIG. 5. Output stage $A'_3$, however, includes not only an unbalanced-to-balanced amplifier A′ but also an electronic shunt circuit SH connected to the line between an input of amplifier A′ and coupling capacitor C′, this circuit SH comprising an electronic switch in the form of a PNP transistor TR whose emitter and collector are bridged by a resistor $R_1$ and whose base is returned to its emitter through a biasing resistor $R_2$. Operating voltage is supplied to the emitter from a negative battery terminal −B through a resistor $R_o$, resistors $R_o$ and $R_1$ forming a voltage divider which provides a suitable biasing potential for the aforementioned input of amplifier A′. The other input of that amplifier is connected to output lead P of pulse generator $GS_c$ to receive synchronizing pulses $Si$ therefrom. Quenching pulses $Sp$ of line-scanning frequency, which may or may not coincide with the synchronizing pulses $Si$, are applied through a resistor $R_3$ to the base of transistor TR.

The occurrence of a quenching pulse $Sp$ during the flyback phase of a line-scanning cycle discharges the capacitor $C'$ and grounds the corresponding input of amplifier $A'$, thereby introducing a d-c component into the transmitted video signals to determine the voltage level assigned to black picture elements. Thus, residual voltages held over from a preceding scanning cycle are promptly eliminated and cannot accumulate into objectionable biasing potentials. Amplifier $A'$ superimposes the line- and frame-synchronizing pulses $Si$ upon the video signals passing through network RE'.

I claim:

1. A videotelephone system comprising:
  a central office;
  a multiplicity of outlying stations served by said central office, each of said stations including a telephone apparatus with signaling means, a video transmitter provided with first sweep-control means and a video receiver provided with second sweep-control means;
  circuitry connecting said stations with said central office, said circuitry including a first link extending from each video transmitter to said central office and a second link extending from said central office to each video receiver;
  signal-responsive equipment at said central office for establishing a connection between two stations, said equipment including switch means with inputs tied to said first links and with outputs tied to said second links;
  a source of synchronizing pulses at said central office connected in parallel to said first links;
  pulse-extraction means at each of said stations connected to said second link thereof for activating said first and second sweep-control means by said synchronizing pulses;
  first amplifier means inserted in said first links at said central office; and
  second amplifier means inserted in said second links at said stations, said source being connected to said first links through said first amplifier means;
  said first amplifier means comprising an input stage, an output stage and a network including a capacitance and a normally open electronic shunt switch connected to said first link between said stages, said electronic switch being connected to said source for periodic closure by a train of quenching pulses at the cadence of said synchronizing pulses to discharge said capacitance, said synchronizing pulses being fed by said source to said output stage.

2. A system as defined in claim 1, further comrpising delay means at each of said stations for relatively staggering the operation of said first and second sweep-control means to compensate for the transit time of video signals and synchronizing pulses on said first and second links.

3. A system as defined in claim 2 wherein said delay means is inserted in a connection between said pulse-extraction means and said first sweep-control means.

4. A system as defined in claim 3 wherein said first and second sweep-control means include a common frame-scan generator connected to said pulse-extraction means, said first sweep-control means further including a first line-scan generator for said video transmitter connected to said pulse-extraction means, said second sweep-control means further including a second line-scan generator for said video receiver connected to said pulse-extraction means, said delay means being inserted between said pulse-extraction means and said first line-scan generator.

5. A system as defined in claim 4 wherein said delay means retards the line scan of said video transmitter with reference to that of said video receiver by an interval equal to the duration of a line-scanning cycle less the combined transit time on said first and second links.

6. A system as defined in claim 1 wherein said input stage comprises a balanced-to-unbalanced amplifier and said output stage comprises an unbalanced-to-balanced amplifier.

7. A system as defined in claim 1, further comprising equalizing means inserted between said input and output stages upstream of said network.

8. A system as defined in claim 1 wherein said equipment includes time-division-multiplexing means for audio communication among said stations, said source delivering to said time-division-multiplexing means a train of sampling pulses at the cadence of said synchronizing pulses.

* * * * *